US006426034B1

(12) United States Patent
McComas et al.

(10) Patent No.: US 6,426,034 B1
(45) Date of Patent: Jul. 30, 2002

(54) RADIATION CURABLE COATING FOR THERMOPLASTIC SUBSTRATES

(75) Inventors: Jerry McComas, Greenwood; Peter Clark, Indianapolis, both of IN (US)

(73) Assignee: Lilly Industries, Inc., Indianapolis, IN (US)

( * ) Notice: Subject to any disclaimer, the term of this patent is extended or adjusted under 35 U.S.C. 154(b) by 52 days.

(21) Appl. No.: 09/702,341

(22) Filed: Oct. 31, 2000

(51) Int. Cl.$^7$ .................. B29C 35/08; B32B 31/00; B32B 27/20; B32B 27/16; C08F 2/46
(52) U.S. Cl. ................. 264/494; 156/275.5; 428/423.1; 428/423.9; 428/424.8; 428/492; 428/500; 428/515; 428/516; 428/522; 522/83; 522/95; 522/96; 522/103; 522/107; 522/121; 522/136; 522/137; 522/142; 522/144; 522/182; 522/79; 522/80
(58) Field of Search .............................. 522/83, 95, 96, 522/103, 136, 137, 144, 182, 107, 121, 142, 79, 80; 264/494; 156/275.5; 428/423.1, 424.8, 423.9, 500, 492, 515, 516, 522

(56) References Cited

U.S. PATENT DOCUMENTS

| 3,966,572 A | * | 6/1976 | Carder ...................... 428/463 |
| 4,110,139 A | * | 8/1978 | Mashida et al. ............. 156/209 |
| 4,169,167 A | * | 9/1979 | McDowell .................. 427/494 |
| 4,170,663 A | * | 10/1979 | Hahn et al. .................. 427/493 |
| 4,214,026 A | * | 7/1980 | Ibata et al. ............. 156/244.17 |
| 4,229,274 A | * | 10/1980 | Carlblom .................... 427/494 |
| 4,643,730 A | | 2/1987 | Chen et al. |
| 4,683,264 A | | 7/1987 | Urata et al. |
| 4,885,332 A | | 12/1989 | Bilkadi |
| 4,997,882 A | | 3/1991 | Martz et al. |
| 5,258,444 A | | 11/1993 | Zezinka et al. |
| 5,258,446 A | | 11/1993 | Enomoto et al. |
| 5,300,326 A | | 4/1994 | Zezinka et al. |
| 5,319,032 A | | 6/1994 | Martz et al. |
| 5,397,602 A | | 3/1995 | Martz et al. |
| 5,490,893 A | * | 2/1996 | Enlow et al. ................. 156/230 |
| 5,585,192 A | | 12/1996 | Sharma et al. |
| 5,585,415 A | | 12/1996 | Gorzalski et al. |
| 5,750,234 A | * | 5/1998 | Johnson et al. ............. 428/141 |
| 5,863,646 A | | 1/1999 | Verardi et al. |
| 5,880,190 A | | 3/1999 | Laura |

* cited by examiner

*Primary Examiner*—Susan W. Berman
(74) *Attorney, Agent, or Firm*—Barnes & Thornburg

(57) ABSTRACT

A liquid, radiation-curable coating suitable for coating thermoplastic substrates is described. The coating composition can be formulated to achieve very low gloss at both high and low angles of incidence, and is suitable for application to moldable thermoplastic sheet, and in particular is suitable for application to thermoplastic olefin moldable sheet. Such coatings are useful in protecting thermoplastic substrates and achieving a low-gloss surface in a wide variety of applications including automotive interior parts, furniture, and artificial leather articles.

25 Claims, No Drawings

RADIATION CURABLE COATING FOR THERMOPLASTIC SUBSTRATES

FIELD OF THE INVENTION

The present invention relates to a radiation curable coating composition useful for coating thermoplastic substrates. More particularly, the invention is directed to a radiation curable resin consisting essentially of monomers, oligomers, or combinations thereof, each a mono or poly-ester of acrylic acid or methacrylic acid wherein each of the esters has a boiling point greater than 162° C. The invention is also directed to a method of reducing the gloss and increasing the scratch-resistance of the surface of a thermoplastic substrate by application of the coating composition, and a method of manufacturing such a thermoplastic substrate.

BACKGROUND AND SUMMARY OF THE INVENTION

Thermoplastic materials such as polyethylene, polypropylene, thermoplastic olefins, EPDM, rubber (ethylene/propylene/diene/monomer) vinyl, and various synthetic and natural rubbers have been developed which are useful in many applications, such as in the manufacture of automotive parts and accessories, furniture, and appliances, and in many other commercial applications.

Thermoplastic sheet materials are particularly useful for applications where it is desired to have an aesthetically pleasing surface that can be molded or laminated onto the functional part or assembly and have a leather-like feel. These thermoplastic sheet materials are particularly useful for automotive interior panels and trim pieces, such as dashboards, doorhandles, and other trim pieces, instrument panels, aircraft headliners, furniture armrests, appliance exteriors, bookbindings, briefcases, and the like.

It is often desirable to coat such thermoplastic sheet materials in order to protect the plastic material from marring, abrasion, and exposure to weather conditions such as sunlight, moisture, heat and cold in order to achieve more durable, longer-lasting parts. Furthermore, it is often desirable to give the thermoplastic sheet a leather-like feel. Additionally, in automotive interior applications, it is desirable to minimize the gloss of the coated article so that an undesirable and potentially dangerous glare does not cause visual impairment to the driver and other vehicle occupants.

Thermoplastic moldable sheet materials are particularly useful in that they can be molded onto a functional part using readily available processes known in the industry such as vacuum forming, thermoforming, or laminating. The application of coatings to flat thermoplastic sheets are simplified due to the lack of curvature of the sheets being coated. Conventional coating applications such as the various spray, roll coating, or curtain coating processes can be used with maximum transfer efficiency and at relatively high line speeds using automated equipment.

Thermoplastic substrates have widely varying surface properties including surface tension and roughness and may require extensive elongation during the molding process. These variations in surface properties has made it difficult to achieve adequate adhesion of the organic coating, particularly after the molding process.

A number of solutions to the problems with adhesion have been investigated including flame treatments, corona treatments, or plasma treatments to oxidize the plastic surface, and the application of various coating compositions containing chlorinated polyolefins, with or without the incorporation of polyhydroxylated polydiene polymers, to increase adhesion has also been investigated (see U.S. Pat. Nos. 4,683,264; 4,997,882; 5,258,444; 5,300,326; 5,319,032; 5,397,602; 5,585,192; 5,880,190; and 5,863,646). Thus, prior to the present invention, achieving adhesion to such difficult to paint substrates like thermoplastic olefins was limited to oxidation of the plastic substrate directly by flame, corona, or plasma treatment, or via the use of chlorinated polyolefins.

Oxidation of the thermoplastic surface by direct flaming poses hazards to the safety of workers as well as the potential for damage to the article being treated. Corona and plasma treatments require costly equipment, and often are not suitable for continuous operations. Additionally, corona and plasma treatments can result in inconsistent adhesion performance due to inconsistent levels of oxidation with resulting surface tension variations. The use of chlorinated polyolefins has generated environmental concerns due to limitations in the recycling of these thermoplastics, or in their disposal, since burning of chlorinated compounds may generate hydrochloric acid and other toxic and environmentally hazardous compounds.

The use of UV-curable formulations comprising a variety of acrylate oligomers and monomers for use on pressure sensitive adhesive tape consisting of polypropylene, polypropylene and thermoplastic olefins to provide a refastenable attachment zone for disposable diapers has been described (see U.S. Pat. No. 4,643,730). However, in contrast to the compositions of the present invention these UV-curable formulations have a limited service life.

As described in U.S. Pat. No. 5,585,415 most radiation-curable coating compositions are cured to glossy, cross-linked coatings, and the addition of conventional flatting pigments results in such high pigment to binder ratios that the binder is not able to hold the pigment and poor film performance results. The use of silica in photocurable coating compositions to improve the abrasion resistance in optical lenses used in eyeglasses is known (see U.S. Pat. No. 4,885,332). The use of a combination of powdered polyamino acid resin and silica in a non-photocurable coating composition composed mainly of a polyurethane resin to achieve a surface with a leather-like feel that is resistant to marring has also been described (see U.S. Pat. No. 5,258,446). However, there has been no description of using silica as a flatting pigment, either alone or in combination with insoluble polymeric beads, to achieve the low gloss radiation-curable coating compositions exhibiting excellent scratch-resistance that are provided in accordance with the present invention.

In one embodiment of the present invention a radiation curable composition is provided. The composition comprises about 20 to about 100 percent by weight free-radical curable resin components consisting essentially of monomers, oligomers, or combinations thereof, each a mono or poly-ester of acrylic acid or methacrylic acid, and each of said esters having a boiling point greater than 162° C. and a molecular weight of about 150 to about 10,000, about 0.1 to about 10 percent by weight of a free radical photoinitiator, and about 0 to about 60% by weight of an organic solvent. At least a portion of the esters in the radiation curable composition may be carboxy functional, may be an acrylic acid or methacrylic acid ester of a polyol containing at least 4 carbon atoms, may include a carbamate functionality, may be acrylic acid or methacrylic acid esters of isoborneol, and/or may be beta-carboxyethyl acrylate or beta-carboxyethyl methacrylate.

In an alternate embodiment of the invention the radiation curable composition may further comprise about 0 to about 50 percent by weight of polymeric beads or powder having a median particle size of about 1 to about 60 microns dispersed in the composition. The polymeric beads or powder may comprise polymers or copolymers of acrylic or methacrylic acid, esters thereof and styrene. Alternatively, the polymeric beads or powder may comprise a polyamide, a polyurethane, a urea/urea methanol condensate or polyurea.

In yet another embodiment of the invention the radiation curable composition may further comprise up to 30 percent silica by weight dispersed in the composition.

In another embodiment of the invention a method for reducing the gloss of the surface of a thermoplastic substrate is provided. The method comprises the steps of applying to the sheet stock a radiation curable composition as described above, irradiating the coated surface with UV radiation for a time sufficient to initiate polymerization of free radical curable components, and forming the thermoplastic sheet stock to a pre-determined shape.

In still another embodiment of the invention a method of manufacturing a low-gloss, scratch-resistant thermoplastic article is provided. The method comprises the steps of obtaining a thermoplastic sheet stock, applying to the thermoplastic sheet stock a radiation curable composition as described above, irradiating the coated surface with UV radiation for a time sufficient to initiate polymerization of free radical curable components, and forming the thermoplastic sheet stock to a pre-determined shape. An article of manufacture prepared in accordance with either of the above-described methods is also provided.

DETAILED DESCRIPTION OF THE INVENTION

A radiation curable composition that is scratch-resistant and reduces the gloss of the surface of a thermoplastic substrate is provided. The composition comprises about 20 to about 100 percent by weight free-radical curable resin components consisting essentially of monomers, oligomers, or combinations thereof, each a mono or poly-ester of acrylic acid or methacrylic acid, and each of said esters having a boiling point greater than 162° C. and a molecular weight of about 150 to about 10,000, about 0.1 to about 10 percent by weight of a free radical photoinitiator, and about 0 to about 60% by weight of an organic solvent.

At least a portion of the esters in the radiation curable composition may be carboxy functional, may be an acrylic acid or methacrylic acid ester of a polyol containing at least 4 carbon atoms, may include a carbamate functionality, may be acrylic acid or methacrylic acid esters of isoborneol, and/or may be beta-carboxyethyl acrylate or beta-carboxyethyl meth-acrylate. Each of the esters has boiling point greater than 162° C., preferably above 180° C., and most preferably above 200° C. The composition may further comprise about 0 to about 50 percent by weight of polymeric beads or powder and up to about 30 percent silica by weight dispersed in the composition.

A variety of monomers and oligomers which are mono or poly-esters of acrylic acid or methacrylic acid may be used in accordance with this invention and comprise about 20 to about 100 percent of the coating composition. These monomers and oligomers include, but are not limited to, the following:

Tetrahydrofurfuryl Methacrylate; Isodecyl Methacrylate; 2(2-Ethoxyethoxy) Ethylacrylate; Stearyl Acrylate; Tetrahydrofuryl Acrylate; Lauryl Methacrylate; Stearyl Methacrylate; Lauryl Acrylate; 2-Phenoxyethyl Acrylate; 2-Phenoxyethyl Methacrylate; Glycidyl Methacrylate; Isodecyl Acrylate; Isobomyl Methacrylate; Isooctyl Acrylate; Tridecyl Acrylate; Tridecyl Methacrylate; Caprolactone Acrylate; Ethoxylated Nonyl Phenol Acrylate; Isobomyl Acrylate; Propoxylated Allyl Methacrylate; Methoxy Polyethylene Glycol Monomethacrylate; Polypropylene Glycol Monomethacrylate; Ethoxylated Nonyl Phenol Methacrylate; BetaCarboxyethyl Acrylate; Beta-Carboxyethyl Methacrylate; Octyl Acrylate; Decyl Acrylate; Octyl Methacrylate; Decyl Methacrylate; Ethoxylated Alkylphenol Acrylate; Ethoxylated Alkylphenol Methacrylate; Ebecryl™ 111, an Epoxy Monoacrylate supplied by UCB Chemicals; Ebecryl™ CL1039 a urethane Monoacrylate supplied by UCB Chemicals; Hexadecyl Acrylate; Hexadecyl Methacrylate; Behenyl Acrylate; Behenyl Methacrylate; Nonyl Phenol Propoxylate Monoacrylate, Nonyl Phenol Propoxylate Monomethacrylate; Polyethylene Glycol Dimethacrylate; Polyethylene Glycol Diacrylate; Tetraethylene Glycol Diacrylate; Triethylene Glycol Diacrylate; Tripropylene Glycol Diacrylate; 1,3 Butylene Glycol Dimethacrylate; Ethoxylated Bisphenol A Dimethacrylate; Ethoxylated Bisphenol A Diacrylate; Cyclohexane Dimethanol Diacrylate; Cyclohexane Dimethanol Dimethacrylate; Polypropylene Glycol Diacrylate; Polypropylene Glycol Dimethacrylate; Polyethylene Glycol Diacrylate; Polyethylene Glycol Dimethacrylate; 1,6 Hexane Diol Diacrylate; 1,6 Hexane Diol Dimethacrylate; Propoxylated Neopentyl Glycol Diacrylate; Propoxylated Neopentyl Glycol Dimethacrylate; Ethoxylated Neopentyl Glycol Diacrylate; Ethoxylated Neopentyl Glycol Dimethacrylate; SR 9209, Alkoxylated Aliphatic Diacrylate supplied by the Sartomer division of Total; Dipropylene Glycol Diacrylate; Dipropylene Glycol Dimethacrylate; Tripropylene Glycol Dimethacrylate; Ebecryl™ 150, a Bisphenol A derivative diacrylate supplied by UCB Chemicals; Trimethylolpropane Trimethacrylate; Trimethylolpropane Triacrylate; Tris (2-Hydroxy Ethyl) Isocyanurate Triacrylate; Tris (2-Hydroxy Ethyl) Isocyanurate Trimethacrylate; Ethoxylated Trimethylolpropane Triacrylate; Propoxylated Trimethylolpropane Triacrylate; Ethoxylated Trimethylolpropane Trimethacrylate; Propoxylated Trimethylolpropane Trimethacrylate; Pentaerythritol Triacrylate; Pentaerythritol Trimethacrylate; Propoxylated Glyceryl Triacrylate; Propoxylated Glyceryl Trimethacrylate; Ethoxylated Glyceryl Triacrylate; Ethoxylated Glyceryl Trimethacrylate; Pentaerythritol Tetraacrylate; Di-Trimethylolpropane Tetraacrylate; Dipentaerythritol Pentaacrylate; Ethoxylated Pentaerythritol Tetraacrylate; SR 9041, a pentaacrylate Ester supplied by the Sartomer division of Total; SR 9008, an Alkoxylated Trifunctional Acrylate Ester supplied by the Sartomer division of Total; CD 9009, a trifunctional Methacrylate Ester supplied by the Sartomer division of Total; SR 9012, a trifunctional Acrylate Ester supplied by the Sartomer division of Total; CD 9050, a Monofunctional Acid Ester supplied by the Sartomer division of Total; CD 9051, a Trifunctional Acid Ester supplied by the Sartomer division of Total; SR 802, an Alkoxylated Diacrylate supplied by the Sartomer division of Total; SR 500 Trifunctional monomer supplied by the Sartomer division of Total; SR 515 Trifunctional monomer supplied by the Sartomer division of Total; SR 516 Difunctional monomer supplied by the Sartomer division of Total; SR 517 Trifunctional monomer supplied by the Sartomer division of Total; SR 518 Tetrafunctional monomer supplied by the Sartomer division of Total; SR 519 Trifunctional monomer supplied by the Sartomer division of Total; SR521 Difunctional monomer supplied by the Sartomer division of Total; SR63 3 Metallic Diacrylate supplied by the Sartomer division of Total; SR634 Metallic Dimethacrylate supplied by the Sartomer division of Total; SR 636 Metallic Diacrylate supplied by the Sartomer division of Total; SR 705 Metallic Diacrylate supplied by the Sartomer division of Total; SR 708, Metallic Dimethacrylate supplied by the Sartomer division of Total; SR 709, metallic Monomethacrylate supplied by the Sartomer division of Total; CN 934, Urethane Acrylate supplied by the Sartomer division of Total; CN 945, Trifunctional Urethane Acrylate supplied by the Sartomer division of Total; CN95 3, Urethane Acrylate supplied by the Sartomer division of Total; CN 961, Urethane Acrylate supplied by the Sartomer division of Total; CN 962, Urethane Acrylate supplied by the Sartomer division of Total; CN 963, Urethane Acrylate supplied by the Sartomer division of Total; CN 964, Urethane Acrylate supplied by the Sartomer division of Total; CN 965, Urethane Acrylate supplied by the Sartomer division of Total; CN 966, Urethane Acrylate supplied by the Sartomer division of Total; CN 980, Urethane Acrylate supplied by the Sartomer division of Total; CN 198, Urethane Acrylate supplied by the Sartomer division of Total; CN 982, Urethane Acrylate supplied by the Sartomer division of Total; CN 983, Urethane Acrylate supplied by the Sartomer division of Total; CN 984 Urethane Acrylate supplied by the Sartomer division of Total; CN 985, Urethane Acrylate supplied by the Sartomer division of Total; CN 986, Urethane Acrylate supplied by the Sartomer division of Total; CN 970, Urethane Acrylate supplied by the Sartomer division of Total; CN 971, Urethane Acrylate supplied by the Sartomer division of Total; CN 972, Urethane Acrylate supplied by the Sartomer division of Total; CN 973, Urethane Acrylate supplied by the Sartomer division of Total; CN 975, Hexafunctional Urethane Acrylate supplied by the Sartomer division of Total; CN 977, Urethane Acrylate supplied by the Sartomer division of Total; CN 978, Urethane Acrylate supplied by the Sartomer division of Total; CN 1 963, Urethane Methacrylate supplied by the Sartomer division of Total; CN 104, Epoxy Acrylate supplied by the Sartomer division of Total; CN 111, Epoxidized Soy Bean Oil Acrylate supplied by the Sartomer division of Total; CN 112, Epoxy Novolak Acrylate supplied by the Sartomer division of Total; CN 115, Modified Epoxy Acrylate supplied by the Sartomer division of Total; CN 117, Modified Epoxy Acrylate supplied by the Sartomer division of Total; CN 118, Acid modified Epoxy Acrylate supplied by the Sartomer division of Total; CN120 Epoxy Acrylate supplied by the Sartomer division of Total; CN 124, Epoxy Acrylate supplied by the Sartomer division of Total; CN 151, Epoxy Methacrylate supplied by the Sartomer division of Total; CN 130, Aliphatic Monoacrylate supplied by the Sartomer division of Total; CN 131, Aromatic Monoacrylate supplied by the Sartomer division of Total; CN 132, Aliphatic Diacrylate supplied by the Sartomer division of Total; CN 920, Polyester Acrylate supplied by the Sartomer division of Total; CN 704, Acrylated Polyester supplied by the Sartomer division of Total; CN 301, Polybutadiene Dimethacrylate supplied by the Sartomer division of Total; SB 400,401,402, 500,510, 520, Aromatic Acid Methacrylate supplied by the Sartomer division of Total; Ebecryl™ 745, Acrylated Acrylic supplied by UCB Chemicals; Ebecryl™ 754 Acrylated Acrylic supplied by UCB Chemicals; Ebecryl™ 1701 Acrylated Acrylic supplied by UCB Chemicals; Ebecryl™ 1710 AcrylatedAcrylic supplied by UCB Chemicals; Ebecryl™ 1755 Acrylated Acrylic supplied by UCB Chemicals; Ebecryl™ 230 Acrylated Urethane supplied by UCB Chemicals; Ebecryl™ 244, Acrylated Urethane supplied by UCB Chemicals; Ebecryl™ 264 Acrylated Urethane supplied by UCB Chemicals; Ebecryl™ 270 Acrylated Urethane supplied by UCB Chemicals; Ebecryl™ 284 Acrylated Urethane supplied by UCB Chemicals; Ebecryl™ 1290 Acrylated Urethane supplied by UCB Chemicals; Ebecryl™ 2001 Acrylated Urethane supplied by UCB Chemicals; Ebecryl™ 4830 Acrylated Urethane supplied by UCB Chemicals; Ebecryl™ 4833 Acrylated Urethane supplied by UCB Chemicals; Ebecryl™ 4835 Acrylated Urethane supplied by UCB Chemicals; Ebecryl™ 4842 Acrylated Urethane supplied by UCB Chemicals; Ebecryl™ 4866 Acrylated Urethane supplied by UCB Chemicals; Ebecryl™ 4883 Acrylated Urethane supplied by UCB Chemicals; Ebecryl™ 5129 Acrylated Urethane supplied by UCB Chemicals; Ebecryl™ 8301 Acrylated Urethane supplied by UCB Chemicals; Ebecryl™ 8402 Acrylated Urethane supplied by UCB Chemicals; Ebecryl™ 8800 Acrylated Urethane supplied by UCB Chemicals; Ebecryl™ 8803 Acrylated Urethane supplied by UCB Chemicals; Ebecryl™ 8804 Acrylated Urethane supplied by UCB Chemicals; Ebecryl™ 8807 Acrylated Urethane supplied by UCB Chemicals; Ebecryl™ 3604 Rubber modified Epoxy Acrylate supplied by UCB Chemicals; Ebecryl™ 3605 Acrylated Bisphenol A Epoxy supplied by UCB Chemicals; Ebecryl™ 3702 Fatty Acid Modified Epoxy Acrylate supplied by UCB Chemicals; Ebecryl™ 3703 Amine Modified Bisphenol A Acrylate supplied by UCB Chemicals; Ebecryl™ 3411 Fatty Acid Modified Epoxy Acrylate supplied by UCB Chemicals; Ebecryl™ 3600 Amine Modified Bisphenol A Acrylate supplied by UCB Chemicals; Ebecryl™ 168 Methacylated Acidic Monomer supplied by UCB Chemicals; Ebecryl™ 170 Acrylated acidic monomer supplied by UCB Chemicals; Ebecryl™ 350 Acrylated Silicone supplied by UCB Chemicals; Ebecryl™ 1360 Silcone Hexaacrylate supplied by UCB Chemicals; Genomer™ 4188 Urethane Acrylate supplied by Rahn; Genomer™ 4205 Urethane Acrylate supplied by Rahn; Genomer™ 4215 Urethane Acrylate supplied by Rahn; Genomer™ 4246 Urethane Acrylate supplied by Rahn; Genomer™ 4269 Urethane Acrylate supplied by Rahn; Genomer™ 4297 Urethane Acrylate supplied by Rahn; Genomer™ 4302 Urethane Acrylate supplied by Rahn; Genomer™ 4312 Urethane Acrylate supplied by Rahn; Genomer™ 4316 Urethane Acrylate supplied by Rahn; Genomer™ 4510 Urethane Acrylate supplied by Rahn; Genomer™ 4661 Urethane Acrylate supplied by Rahn; Genomer™ 4205 Urethane Acrylate supplied by Rahn; Genomer™ 5248 Urethane Acrylate supplied by Rahn; Genomer™ 5275 Urethane Acrylate supplied by Rahn; Genomer™ 5695 Urethane Acrylate supplied by Rahn; Genomer™ 7154 Urethane Acrylate supplied by Rahn; Photomer® 5018, polyester acrylate supplied by Photomer Energy Curing Chemicals; Photomer® 5018, polyester acrylate supplied by Photomer Energy Curing Chemicals; RCC™ 13-429, polyester acrylate supplied by Photomer Energy Curing Chemicals; RCC™ 13-430, polyester acrylate supplied by Photomer Energy Curing Chemicals; RCC™ 13-432, polyester acrylate supplied by Photomer Energy Curing Chemicals; RCC™ 13-433, polyester acrylate supplied by Photomer Energy Curing Chemicals; Photomer® 6008, Urethane Acrylate supplied by Photomer Energy Curing Chemicals; Photomer® 6010, Urethane Acrylate supplied by Photomer Energy Curing Chemicals; Photomer® 6022, Urethane Acrylate supplied by Photomer Energy Curing Chemicals; Photomer® 6184, Urethane Acrylate supplied by Photomer Energy Curing Chemicals; Photomer® 6210, Urethane Acrylate supplied by Photomer Energy Curing Chemicals; Photomer® 6217, Urethane Acrylate supplied by Photomer Energy Curing Chemicals; Photomer® 6788-20R, Urethane Acrylate supplied by Photomer Energy Curing Chemicals; Photomer® 6893, Urethane Acrylate supplied by Photomer Energy Curing Chemicals; RCC™ 12-891, Urethane Acrylate supplied by Photomer Energy Curing Chemicals; RCC™ 12-892, Urethane Acrylate supplied by Photomer Energy Curing Chemicals; RCC™ 13-363, Urethane Acrylate supplied by Photomer Energy Curing Chemicals; Photomer® 6173, Aromatic Acrylate supplied by Photomer Energy Curing Chemicals; RCC™ 13-424, Polyester Acrylate supplied by Photomer Energy Curing Chemicals.

The monomers and oligomers useful for the UV coating compositions of the present invention may have one or more alpha, beta ethylenically unsaturated functional groups. Monomers and oligomers having one, two, three, or four alpha, beta ethylenically unsaturated functional groups per molecule are well-known. It is generally understood that as the number of alpha, beta ethyleneically unsaturated functional groups are increased from one per molecule to more than one per molecule the number of branches and crosslinks in the cured coating will increase. The degree of crosslinking can result in harder coatings that may have improved solvent resistance or may demonstrate other desirable properties. However, this increase in hardness generally must be balanced by the result that the higher level of crosslinking may provide a less flexible film.

In applications where high degrees of flexibility would be an important characteristic for the coating, a significant majority of the monomers and oligomers would be selected from a list of monofunctional and difunctional materials. In order to achieve the highest levels of flexibility, the monomers and oligomers would be selected exclusively from a list of monofunctional and difunctional monomers and oligomers with a significant majority being from a list of monofunctional monomers and oligomers.

It is well known in the art of UV-curable coatings that a suitable photoinitiator may be used in order to promote the polymerization of unsaturated monomers and oligomers. These photoinitiators may comprise about 0.1 to about 10 percent by weight of the coating composition and may be used singly, in combination, or with the addition of suitable synergists. Exemplary of photoinitiators that may be use in accordance with the present invention are the following:

Benzil Dimethyl Ketal; Trimethylbenzophenone; Benzophenone; 1-Hydroxycyclohexylphenyl Ketone; 2-Benzyl-2-(dimethylamino)-4'-morpholinobutyrophenone; 2,2-Dimethoxy-2-phenylacetophenone; Isopropylthioxanthone; Hydroquinone; Hydroquinone monomethyl ether; p-Benzoquinone; 4-Chlorobenzophenone, 4-Hydroxy Benzophenone; 4,4-bis-(N,N-dimethylamino)-benzophenone; Thioxanthones; Xanthones; Acridine derivatives; Quinoxaline derivatives and 1-Phenyl-1,2-propanedione-2-O-benzoyl Oxime; Naphthaquinone; Anthraquinone; 2-Methylanthraquinone; 2-Ethylanthraquinone; 2 tert-Butylanthraquinone; 1-Chloroanthraquinone; 2-Chloroanthraquinone benzylidene; 2-Amylanthraquinone; Triphenylphosphine; Phenyl-bis-(2,4,6-Trimethylbenzoyl) phosphine oxide; 2,4,4 Trimethylpentyl-bis-(2',6'-dimethoxybenzoyl)phosphine oxide; Acetophenone; 2,2-Dimethoxyacetophenone; 1,1-Dichloroacetophenone; Propiophenone; Cyclcopropyl Phenyl Ketone; Benzaldehyde; Beta-Naphylphenyl Ketone; D,L-Camphorquinone; Beta-Naphthaldehyde; Beta-Acetonaphthone; 2,3-Pentanedione; Benzil; Fluorenone; Benzanthrone; Bis (parahydroxybenzylidene)acetone; Benzoin; Benzoin Methyl Ether; Benzoin Ethyl Ether; Benzoin Isopropyl Ether; Benzoin Phenyl Ether; Benzoin Acetate; Deoxybenzoin; Chlorodeoxybenzoin; 2,2-Dimethyloxy-2-phenyl, 1,3, 5-Triacetyl Benzene; 2,5-Diethoxy Stilbene; Thioxanthone; Anthracene; Pyrene; Picramide; Nitronaphthalene; 5-Nitroacenaphthalene; 2-Nitrofluorene; Rose Bengal; Acridine Orange; Chlorophyllin; Crystal Violet; Eosin Y; Fluorescein; Flavin Mononucleotide; Hematoporphyrin; Hemin; Malachite Green; Methylene Blue; Rhodamine B; Chlorophyll; Cosine; Erthrosin; Methylene Green; Toluidine Blue; Thionine; Azidobenzene; p-phenyl bisazide; p-azidobenzophenone; 4,4'-Diazidobenzophenone;4,4'-Diazidodiphenylmethane;4,4'-Diazido-stilbene; 4,4'-diazidochalcone; 3,6-Di(4'-azidobenzal)cyclohexanone;2,6-Di(4'-azidobenzal)-4-methylcyclohexanone; p-Diazodiphenylamineparaformaldehyde condensates; 1-Diazo-4-dimethylaminobenzene Hydro-fluoroborate; 1-Diazo-3-methyl-4-dimethylaniline sulfate; 1,2-Napthoquinonediazide; 2,3,4-Trihydroxybenzophenone; Bis-(naphthoquinone-1,2-diazido-5-sulfonate); 2-(Naphthoquinone-1,2-diazido-5 sulfonyloxy)-3-hydroxynaphthalene; Naphthoquinone-1,2-diasido-5-sulfonic acid novolak ester; Naphthoquinone-1,2-diazido-5-sulfanilide; Azidobenzoic Acid; Azidophthalic Acid; Benzene Chromium Tricabonyl; 2-Methyl-4'-(methylthio)-2 morpholinopropiophenone; 2-Hydroxy-2-methylpropiophenone.

There are a wide variety of silica flatting pigments useful in the present invention and these silicas may be of the precipitated type, the hydrothermal type, the hydrogel type, the aerogel type, or of a type produced by another known process for the production of silica flatting pigments. The radiation-curable coating composition may comprise up to about 30 percent silica by weight dispersed in the composition. Silica flatting pigments that may be used in the low-gloss, scratch-resistant coatings of the present invention include, but are not limited to, the silica flatting pigments shown in Table 1.

TABLE 1

| Supplier | Trade Name | Silica Type | Median Particle Size Microns |
| --- | --- | --- | --- |
| Davison Division, W. R. Grace | Syloid 72 | hydrogel | 4 |
| Davison Division, W. R. Grace | Syloid 74 X-6000 | hydrogel | 7 |
| Davison Division, W. R. Grace | Syloid 74 | hydrogel | 8 |
| Davison Division, W. R. Grace | Syloid 74 X-4500 | hydrogel | 8.5 |
| Davison Division, W. R. Grace | Syloid 74 X-3500 | hydrogel | 9 |
| Davison Division, W. R. Grace | Syloid 83 | hydrogel | 5.5 |

TABLE 1-continued

| Supplier | Trade Name | Silica Type | Median Particle Size Microns |
|---|---|---|---|
| Davison Division, W. R. Grace | Syloid 161 | hydrogel | 7 |
| Davison Division, W. R. Grace | Syloid 162 | hydrogel | 10 |
| Davison Division, W. R. Grace | Syloid 169 | hydrogel | 4.5 |
| Davison Division, W. R. Grace | Syloid 234 | aerogel | 3 |
| Davison Division, W. R. Grace | Syloid 235 | aerogel | 3.7 |
| Davison Division, W. R. Grace | Syloid 244 | aerogel | 3.3 |
| Davison Division, W. R. Grace | Syloid 308 | hydrogel | 7 |
| Davison Division, W. R. Grace | Syloid 378 | hydrogel | 4 |
| Degussa | OK 412 | hydro-thermal | 1–7 |
| Huber | Zeothix 95 | precipitated | 5 |
| PPG Industries | Lo-Vel (R) 27 | precipitated | 1.7 |
| PPG Industries | Lo-Vel (R) 275 | precipitated | 3.6 |
| PPG Industries | Lo-Vel (R) 28 | precipitated | 4.2 |
| PPG Industries | Lo-Vel (R) 29 | precipitated | 4.8 |
| PPG Industries | Lo-Vel (R) 39A | precipitated | 6.7 |
| PPG Industries | Lo-Vel (R) 66 | precipitated | 2.4 |
| Millenium Specialty Chemicals | Silcron G-100 | aerogel | 3 |
| Millenium Specialty Chemicals | Silcron G-130 | hydrogel | 3 |
| Millenium Specialty Chemicals | Silcron G-300 | hydrogel | 4.2 |
| Millenium Specialty Chemicals | Silcron G-310 | hydrogel | 5 |
| Millenium Specialty Chemicals | Silcron G-500 | hydrogel | 5 |
| Millenium Specialty Chemicals | Silcron G-510 | hydrogel | 6 |
| Millenium Specialty Chemicals | Silcron G-520 | hydrogel | 5 |
| Millenium Specialty Chemicals | Silcron G-530 | hydrogel | 6 |
| Millenium Specialty Chemicals | Silcron G-550 | hydrogel | 5 |
| Millenium Specialty Chemicals | Silcron G-600 | hydrogel | 4.7 |
| Millenium Specialty Chemicals | Silcron G-601 | hydrogel | 6.5 |
| Millenium Specialty Chemicals | Silcron G-602 | hydrogel | 7.1 |
| Millenium Specialty Chemicals | Silcron G-603 | hydrogel | 10.1 |
| Millenium Specialty Chemicals | Silcron G-640 | hydrogel | 4 |

The present invention also provides for the use of insoluble polymeric beads or powders in order to achieve low-gloss coatings that have the desired "leather-like" feel, as well as resistance to marring and scratching. The polymeric beads or powder may comprise about 0 to about 50 percent by weight of the composition and are dispersed in the composition. The polymeric beads may comprise polymers or copolymers of acrylic or methacrylic acid, esters thereof and styrene (Sekisui Plastics Co. Ltd., Tokyo Japan). Alternatively, the polymeric beads or powder may comprise a polyamide (Elf Atochem North America, Inc. Philadelphia, Pa.), a polyurethane (Reichhold Chemicals, Inc., Research Triangle Park, N.C.), a urea/urea methanol condensate or polyurea (Martinswerk GmbH, Bergheim, Germany). The polymeric beads useful in the present invention have a median particle size of about 1 to about 60 microns. Types of beads exemplary of those that may be used in the radiation-curable compositions of the present invention along with their supplier, tradenames, and median particle sizes are shown in Table 2.

TABLE 2

| Supplier | Trade Name | Type | Median Particle Size Microns |
|---|---|---|---|
| Sekisui Plastics | Techpolymer MB-4 | Acrylate | 4 |
| Sekisui Plastics | Techpolymer MB-5 | Acrylate | 8 |
| Sekisui Plastics | Techpolymer MB20X-5 | Acrylate | 5 |
| Sekisui Plastics | Techpolymer MBX-8 | Acrylate | 8 |
| Sekisui Plastics | Techpolymer MBX-12 | Acrylate | 12 |
| Sekisui Plastics | Techpolymer MBX-15 | Acrylate | 15 |
| Sekisui Plastics | Techpolymer MBX-20 | Acrylate | 20 |
| Sekisui Plastics | Techpolymer MBX-30 | Acrylate | 30 |
| Sekisui Plastics | Techpolymer MBX-40 | Acrylate | 40 |
| Sekisui Plastics | Techpolymer MBX-50 | Acrylate | 50 |
| Sekisui Plastics | Techpolymer SBX-6 | Polystyrene | 6 |
| Sekisui Plastics | Techpolymer SBX-8 | Polystyrene | 8 |
| Sekisui Plastics | Techpolymer SBX-17 | Polystyrene | 17 |
| Elf Atochem | Orgasol 1002 D | Polyamide | 20 |
| Elf Atochem | Orgasol 2001 UD | Polyamide | 5 |
| Elf Atochem | Orgasol 2001 EX D | Polyamide | 10 |
| Elf Atochem | Orgasol 2002 D | Polyamide | 20 |
| Elf Atochem | Orgasol 2002 ES 3 | Polyamide | 30 |
| Elf Atochem | Orgasol 2002 ES 4 | Polyamide | 40 |
| Elf Atochem | Orgasol 2002 ES 5 | Polyamide | 50 |
| Elf Atochem | Orgasol 2002 ES 6 | Polyamide | 60 |
| Elf Atochem | Orgasol 3202 | Polyamide | 20 |
| Elf Atochem | Orgasol 3501 EX D | Polyamide | 10 |
| Elf Atochem | Orgasol 3502 D | Polyamide | 20 |
| Reichhold | Soft-Clad (R) CFB-100 | Polyurethane | 15–25 |
| Reichhold | Soft-Clad (R) CFB-101-40 | Polyurethane | 5–10 |
| Martinswerk | Pergopak M3 | Urea | 5–7.5 |
| Martinswerk | Pergopak M4 | Urea | 4–6 |

In addition to the silica and/or powder or polymeric beads added to the radiation-curable coating composition to provide abrasion resistance and the desired "leather-like" feel, the composition of the present invention may optionally be further modified with polymeric binder materials, resin-dependent curing agents or catalysts, flow aids, wetting agents, dispersing agents, fillers, fibers, antistatic agents, lubricants, surfactants, plasticizers, rheology modifiers, and coupling agents. Optionally, colored or functional pigments may also be included in the composition. Such compositions can be cured, for example, by irradiation under a Mercury vapor lamp or by electron beam irradiation with or without photoinitiators.

The coating compositions are produced using standard techniques for making organic, solvent-based coatings. The ingredients are combined and mixed using standard mixing equipment, normally in a tank or vessel. It is normal to add the liquid ingredients first and then add the solid materials while the liquid is being agitated. High speed dispersers may be used to break up any solid materials that tend to agglomerate during the mixing process.

The application of the coating may also be by any conventional coating technique including air atomized spray, high volume low pressure spray, airless spray, air assisted airless spray, electrostatic air atomized spray, electrostatic bell, electrostatic disk, roll coating, reverse roll coating, curtain coating, dipping, or flow coating. For the application to moldable plastic sheets, spray application, rollcoating, or curtain coating are preferred. The viscosity of the coating may be adjusted by the selection and addition of suitable solvents as is well known to those skilled in the art of coating formulations and their application. Further the coating composition of the present invention may be used as the sole film-forming composition on the substrate, or may be utilized as a primer or adhesion promoting layer for subsequent applications of organic film-forming compositions.

Optionally, the coating composition can be reduced in viscosity with a suitable solvent for purposes of application.

For conventional air spray, airless spray, flow coating, or curtain coating applications, a viscosity of from about 10 to about 350 centipose is typically used and preferably a viscosity from about 10 to about 100 centipose is used. For roll coating applications a viscosity of from about 100 to about 500 centipose is typically used, but preferably a viscosity of from about 100 to about 200 centipose is used.

The composition of the present invention may be applied to thermoplastic sheet materials and is particularly useful for automotive interior panels and trim pieces, such as dashboards, doorhandles, and other trim pieces, instrument panels, aircraft headliners, furniture armrests, appliance exteriors, bookbindings, briefcases, and the like. The composition may be applied with or without any surface preparation or pretreatment. Such preparation may include mechanical or chemical treatments, such as the use of conventional cleaning liquids or solvents such as isopropanol, naptha, mineral spirits, methyl isobutyl ketone, acetone, or any other well-known or suitable solvent. The pretreatment may also include, for example, treatments such as abrasive sanding, flame treatment, corona treatment, or plasma treatment.

Also provided are a method of reducing the gloss of the surface of a thermoplastic substrate and a method of manufacturing a low-gloss, scratch-resistant thermoplastic article. The methods comprise the steps of obtaining a thermoplastic sheet stock, applying to the thermoplastic sheet stock the radiation-curable composition of the present invention, irradiating the coated surface with UV radiation for a time sufficient to initiate polymerization of free radical curable components, and forming the thermoplastic sheet stock to a pre-determined shape. According to the methods of the present invention, the thermoplastic sheet stock may first be irradiated to cure the composition and then formed to a pre-determined shape, or, alternatively, the thermoplastic sheet stock may be formed to a pre-determined shape and then irradiated to initiate polymerization of free radical curable components. The thermoplastic sheet stock comprises a thermoplastic sheet prior to forming the sheet stock into a pre-determined shape. The pre-determined shape is that of the article being manufactured such as automotive interior panels and trim pieces, including dashboards, doorhandles, and other trim pieces, instrument panels, aircraft headliners, furniture armrests, appliance exteriors, bookbindings, briefcases, and the like.

Also provided are articles coated with from about 1 to about 60 microns of the coating composition according to the methods of the present invention. More typically, the coatings would be applied at from about 5 to about 60 microns, and preferably from about 10 to about 40 microns, and more preferably from about 20 to about 30 microns dry film thickness.

The invention is further described by reference to the following examples. These examples are illustrative of the present invention and are not intended to limit the scope of the invention.

EXAMPLE 1

In a suitable container, the following ingredients were combined and mixed under agitation. The combined ingredients were mixed under moderate agitation for at least 15 minutes prior to use. The coating composition was mixed in air, and not under a nitrogen blanket, although it would be possible to mix and store the coating composition under a nitrogen atmosphere, and this could improve the shelf life of the compositions.

|  | Examples: | | | | |
| --- | --- | --- | --- | --- | --- |
| Ingredients: | 1A | 1B | 1C | 1D | 1E |
| HDODA | 58.5 | | | | |
| IBOA | | 58.5 | | | |
| DEGDA | | | 58.5 | | |
| THEICTA | | | | 58.5 | |
| BCEA | | | | | 58.5 |
| Escacure ™ TZT | 2.3 | 2.3 | 2.3 | 2.3 | 2.3 |
| Methyl Ethyl Ketone | 39.1 | 39.1 | 39.1 | 39.1 | 39.1 |
| Fluorad ™ FC430 | 0.1 | 0.1 | 0.1 | 0.1 | 0.1 |
| Total: | 100 | 100 | 100 | 100 | 100 |

HDODA is an abbreviation for 1,6 Hexanediol Diacrylate.
IBOA is an abbreviation for Isobomyl Acrylate.
DEGDA is an abbreviation for Diethylene Glycol Diacrylate.
THEICTA is an abbreviation for Tris (2-Hydroxyethyl) Isocyanurate Triacrylate
BCEA is an abbreviation for Beta-Carboxyethyl Acrylate
Escacure™ TZT is a trade marked product supplied by Sartomer Company, Inc. a member of Total Group, Exton, Pa., and has Trimethylbenzophenone as the active ingredient.
Fluorad™ FC 430 is a fluorocarbon additive supplied by Minnesota Mining and Manufacturing Company, St. Paul Minn.
All parts in each example are by weight.

EXAMPLE 2

In a suitable container, the following ingredients were combined and mixed under agitation. The combined ingredients were mixed under moderate agitation for at least 15 minutes prior to use. The coating composition was mixed in air, and not under a nitrogen blanket, although it would be possible to mix and store the coating composition under a nitrogen atmosphere, and this could improve the shelf life of the compositions.

|  | Examples: | | | | | |
| --- | --- | --- | --- | --- | --- | --- |
| Ingredients: | 2A | 2B | 2C | 2D | 2E | 2F |
| IBOA | | | | 29.3 | 29.3 | 15 |
| BCEA | | | | | 29.3 | |
| ZDMA | | | | | | 15 |
| CN966J75 | 58.5 | | | | | |
| Ebecryl ™ CL1039 | | 58.5 | | 29.3 | | 30 |
| CN704 | | | 58.5 | | | |
| Escacure ™ TZT | 2.3 | 2.3 | 2.3 | 2.3 | 2.3 | 2.3 |
| Methyl Ethyl Ketone | 39.1 | 39.1 | 39.1 | 39.0 | 39.0 | 37.6 |
| Fluorad ™ FC430 | 0.1 | 0.1 | 0.1 | 0.1 | 0.1 | 0.1 |
| Total: | 100 | 100 | 100 | 100 | 100 | 100 |

IBOA is an abbreviation for Isobomyl Acrylate.
BCEA is an abbreviation for Beta-Carboxyethyl Acrylate.
ZDMA is an abbreviation for Zinc Dimethacrylate.
CN966J75 is the product code for a Urethane Acrylate blended with Isobomyl Acrylate and is supplied by the Sartomer Company, Inc. a member of Total Group, Exton, Pa.
Ebecryl™ CL1039 is the trademark for a Urethane Monoacrylate supplied by the UCB Chemicals Group, Smyrna, Ga.

CN704 is the product code of an Acrylated Polyester supplied by the Sartomer Company, Inc. a member of Total Group, Exton, Pa.

Escacure™ TZT is a trade marked product supplied by Sartomer Company, Inc. a member of Total Group, Exton, Pa., and has Trimethylbenzophenone as the active ingredient.

Fluorad™ FC 430 is a fluorocarbon additive supplied by Minnesota Mining and Manufacturing Company, St. Paul Minn.

EXAMPLE 3

In a suitable container, the following ingredients were combined and mixed under agitation. The combined ingredients were mixed under moderate agitation for at least 15 minutes prior to use. The coating composition was mixed in air, and not under a nitrogen blanket, although it would be possible to mix and store the coating composition under a nitrogen atmosphere, and this could improve the shelf life of the compositions.

|  | Examples: | | | | |
| --- | --- | --- | --- | --- | --- |
| Ingredients: | 3A | 3B | 3C | 3D | 3E |
| BCEA | 55 |  |  | 40.2 |  |
| Caprolactone Acrylate |  |  | 55 |  |  |
| CN301 |  | 55 |  |  |  |
| Ebecryl ™ 3604 |  |  |  |  | 23.2 |
| Escacure ™ TZT | 2 | 2 | 2 |  |  |
| Irgacure ® 500 |  |  |  | 1.5 | 1.5 |
| Methyl Ethyl Ketone | 7 | 7 | 7 |  |  |
| Butyl Acetate | 35.9 | 35.9 | 35.9 | 48 | 75 |
| Fluorad ™ FC430 | 0.1 | 0.1 | 0.1 | 0.1 | 0.1 |
| Totals: | 100 | 100 | 100 | 100 | 100 |

BCEA is an abbreviation for Beta-Carboxyethyl Acrylate.

CN301 is the product code for Polybutadiene Dimethacrylate supplied by the Sartomer Company, Inc. a member of Total Group, Exton, Pa.

Ebecryl™ 3604 is the trademark for a rubber modified epoxy Acrylate supplied by the UCB Chemicals Group, Smyrna, Ga.

Escacure™ TZT is a trade marked product supplied by Sartomer Company, Inc. a member of Total Group, Exton, Pa., and has Trimethylbenzophenone as the active ingredient.

Irgacure™ 500 is a registered trademarked product of Ciba Specialty Chemicals and is a blend of 50% benzophenone and 50% 1-Hydroxycyclohexylphenyl Ketone.

Fluorad™ FC 430 is a fluorocarbon additive supplied by Minnesota Mining and Manufacturing Company, St. Paul Minn.

EXAMPLE 4

In a suitable container, the following ingredients were combined and mixed under agitation. The combined ingredients were mixed under moderate agitation for at least 15 minutes prior to use. The coating composition was mixed in air, and not under a nitrogen blanket, although it would be possible to mix and store the coating composition under a nitrogen atmosphere, and this could improve the shelf life of the compositions.

|  | Examples: | | | |
| --- | --- | --- | --- | --- |
| Ingredients: | 4A | 4B | 4C | 4D |
| Ebecryl ™ 5129 |  |  |  | 50 |
| CN301 |  |  | 50 |  |
| Lauryl Methacrylate |  | 50 |  |  |
| CD9050 | 50 |  |  |  |
| Irgacure ® 500 | 1.2 | 1.2 | 1.2 | 1.2 |
| Methyl Ethyl Ketone | 48.5 | 48.5 | 48.5 | 48.5 |
| Fluorad ™ FC430 | 0.3 | 0.3 | 0.3 | 0.3 |
| Totals: | 100 | 100 | 100 | 100 |

Ebecryl™ 5129 is the trademark for a Hexafunctional aliphatic urethane Acrylate supplied by the UCB Chemicals Group, Smyrna, Ga.

CN301 is the product code for Polybutadiene Dimethacrylate supplied by the Sartomer Company, Inc. a member of Total Group, Exton, Pa.

CD9050 is the product code for Monofunctional Acid Ester supplied by the Sartomer Company, Inc. a member of Total Group, Exton, Pa.

Irgacure® 500 is a registered trademarked product of Ciba Specialty Chemicals and is a blend of 50% benzophenone and 50% 1-Hydroxycyclohexylphenyl Ketone.

Fluorad™ FC 430 is a fluorocarbon additive supplied by Minnesota Mining and Manufacturing Company, St. Paul Minn.

EXAMPLE 5

In a suitable container, the following ingredients were combined and mixed under agitation. The combined liquid ingredients were mixed under moderate agitation, and the dry powders were added under moderate agitation and then dispersed using a high speed disperser for at least 15 minutes. The coating composition was mixed in air, and not under a nitrogen blanket, although it would be possible to mix and store the coating composition under a nitrogen atmosphere, and this could improve the shelf life of the compositions.

|  | Examples: | | | | | | | | |
| --- | --- | --- | --- | --- | --- | --- | --- | --- | --- |
| Ingredients | 5A | 5B | 5C | 5D | 5E | 5F | 5G | 5H | 5I |
| BCEA | 43.7 | 43.7 | 35.3 | 40.7 | 45.8 | 46 | 49 | 25 | 25 |
| Stearyl Acrylate |  |  |  |  |  |  |  | 25.8 | 25.8 |
| CN301 |  |  | 17 | 4 | 13 |  |  |  |  |

-continued

| Ingredients | 5A | 5B | 5C | 5D | 5E | 5F | 5G | 5H | 5I |
|---|---|---|---|---|---|---|---|---|---|
| Escacure ™ TZT | 2 | 2 | 2 | 2 | 2 | 2.5 | 2.5 | 2 | 2 |
| Methyl Ethyl Ketone | 7.5 | 8 | 7.2 | 7 | 7.8 |  | 10 | 77 | 7 |
| Butyl Acetate | 38.3 | 37.8 | 30 | 37.8 | 24.1 | 41.4 | 29 | 30.9 | 29.9 |
| Syloid ™ 169 | 4.2 | 4.2 | 4.2 | 4.2 | 3.6 | 5 | 4.7 | 4.6 | 4.6 |
| Techpolymer ™ MB20X-5 | 4.2 | 4.2 | 4.2 | 4.2 | 3.6 | 5 | 4.7 | 4.6 | 4.6 |
| Fluorad ™ FC430 | 0.1 | 0.1 | 0.1 | 0.1 | 0.1 | 0.1 | 0.1 | 0.1 | 0.1 |
| Total | 100 | 100 | 100 | 100 | 100 | 100 | 100 | 100 | 100 |

BCEA is an abbreviation for Beta-Carboxyethyl Acrylate.

CN301 is the product code for Polybutadiene Dimethacrylate supplied by the Sartomer Company, Inc. a member of Total Group, Exton, Pa.

Escacure™ TZT is a trade marked product supplied by Sartomer Company, Inc. a member of Total Group, Exton, Pa., and has Trimethylbenzophenone as the active ingredient.

Syloid™ 169 is the trade name for a hydrogel type silica supplied by the Davison Division of W. R. Grace, Columbia, Md.

Techpolymer™ MB20X-5 is the trade name for an acrylate polymeric bead supplied by Sekisui Plastics Co., Ltd., Tokyo, Japan.

Fluorad™ FC 430 is a fluorocarbon additive supplied by Minnesota Mining and Manufacturing Company, St. Paul Minn.

EXAMPLE 6

In a suitable container, the following ingredients were combined and mixed under agitation. The combined liquid ingredients were mixed under moderate agitation, and the dry powders were added under moderate agitation and then dispersed using a high speed disperser for at least 15 minutes. The coating composition was mixed in air, and not under a nitrogen blanket, although it would be possible to mix and store the coating composition under a nitrogen atmosphere, and this could improve the shelf life of the compositions.

BCEA is an abbreviation for Beta-Carboxyethyl Acrylate.

TRPGDA is an abbreviation for Tripropylene glycol diacrylate.

Ebecryl™ 3708 is the trademark for an acrylated epoxy resin supplied by the UCB Chemicals Group, Smyrna, Ga.

Ebecryl™ 168 is the trademark for an acidic Methacrylate supplied by the UCB Chemicals Group, Smyrna, Ga.

Escacure™ TZT is a trade marked product supplied by Sartomer Company, Inc. a member of Total Group, Exton, Pa, and has Trimethylbenzophenone as the active ingredient.

Techpolymer™ MB20X-5 is the trade name for an Acrylate polymeric bead supplied by Sekisui Plastics Co., Ltd., Tokyo, Japan.

Spenlite™ L06-S-30 is an aliphatic urethane resin supplied by Reichhold, Research Triangle Park, N.C.

Fluorad™ FC 430 is a fluorocarbon additive supplied by Minnesota Mining and Manufacturing Company, St. Paul Minn.

EXAMPLE 7

In a suitable container, the following ingredients were combined and mixed under agitation. The combined liquid ingredients were mixed under moderate agitation, and the dry powders were added under moderate agitation and then dispersed using a high speed disperser for at least 15 minutes. The coating composition was mixed in air, and not under a nitrogen blanket, although it would be possible to

| Ingredients | 6A | 6B | 6C | 6D | 6E | 6F | 6G | 6H | 6I |
|---|---|---|---|---|---|---|---|---|---|
| BCEA | 45.4 | 22.5 | 21.1 | 20.7 | 30.1 |  | 45 | 43.1 | 43.1 |
| TRPGDA |  |  |  |  |  | 19 |  |  |  |
| CL1039 |  |  | 21.1 | 20 |  |  |  |  |  |
| Ebecryl ™ 3708 |  | 22.9 |  |  |  |  |  |  |  |
| Ebecryl ™ 168 |  |  |  |  |  | 9 |  |  |  |
| Escaure ™ TZT | 2.8 | 2.8 | 2.5 | 2 | 2 | 2 | 2.1 | 2.1 | 2.1 |
| Methyl Ethyl Ketone |  |  |  |  | 7 | 7 | 29.8 | 28.5 | 27.5 |
| Butyl Acetate | 46 | 46 | 42.5 | 36 |  | 39 |  |  |  |
| Toluene |  |  |  |  | 16 |  |  |  |  |
| Isopropanol |  |  |  |  | 16 |  |  |  |  |
| Dibutyl Phthalate |  |  |  |  |  |  |  |  | 1 |
| Techpolymer ™ MB20X-5 | 5.7 | 5.7 | 12.7 | 22 | 23.7 | 24 | 23 | 26.2 | 26.2 |
| Spenlite ™ L06-S-30 |  |  |  |  | 5.1 |  |  |  |  |
| Fluorad ™ FC430 | 0.1 | 0.1 | 0.1 | 0.1 | 0.1 | 0.1 | 0.1 | 0.1 | 0.1 |
| Total | 100 | 100 | 100 | 100 | 100 | 100 | 100 | 100 | 100 | mix and store the coating composition under a nitrogen atmosphere, and this could improve the shelf life of the compositions.

| Ingredients | Examples: | | | | | | | | |
|---|---|---|---|---|---|---|---|---|---|
| | 7A | 7B | 7C | 7D | 7E | 7F | 7G | 7H | 7I |
| BCEA | | 45.2 | 63.1 | 45 | 19 | 38 | 30 | 36 | |
| IBOA | 26.6 | | | | | | | | |
| Ebecryl ™ 3708 | | | | | | | | | 13.5 |
| CN981B88 | | | | | | | | | 27 |
| CN966J75 | | | | | | | 10 | | |
| Ebecryl ™ 1039 | 26.6 | | | | | | | | |
| Escaure ™ TZT | 2.1 | 2.8 | 2.2 | 2.8 | 1.2 | 2.0 | 2.5 | 2 | 2.5 |
| Methyl Ethyl Ketone | 35.7 | | | | | 7 | | 7 | 10 |
| Butyl Acetate | | 45.1 | 30 | 46.5 | 13 | | 51.4 | | 42.8 |
| Toluene | | | | | 24 | 21 | | 20 | |
| Isopropanol | | | | | 24 | 21 | | 20 | |
| Syloid ™ 169 | | 6.8 | 4.6 | 5.6 | 2.4 | 4.4 | 6 | 8 | 4.1 |
| Syloid ™ 244 | 8.9 | | | | | | | | |
| Spenlite ™ L06-S-30 | | | | | 16.4 | 6.6 | | 6.9 | |
| Fluorad ™ FC430 | 0.1 | 0.1 | 0.1 | 0.1 | 0.1 | 0.1 | 0.1 | 0.1 | 0.1 |
| Total | 100 | 100 | 100 | 100 | 100 | 100 | 100 | 100 | 100 |

BCEA is an abbreviation for Beta-Carboxyethyl Acrylate.

IBOA is an abbreviation for Isobornyl Acrylate.

Ebecryl™ 3708 is the trademark for an acrylated epoxy resin supplied by the UCB Chemicals Group, Smyrna, Ga.

CN981B88 is the product code for a Urethane Acrylate blended with Tripropylene Glycol Diacrylate and is supplied by the Sartomer Company, Inc. a member of Total Group, Exton, Pa.

CN966J75 is the product code for a Urethane Acrylate blended with Isobornyl Acrylate and is supplied by the Sartomer Company, Inc. a member of Total Group, Exton, Pa.

Ebecryl™ CL1039 is the trademark for a Urethane Monoacrylate supplied by the UCB Chemicals Group, Smyrna, Ga.

Escacure™ TZT is a trade marked product supplied by Sartomer Company, Inc. a member of Total Group, Exton, Pa, and has Trimethylbenzophenone as the active ingredient.

Syloid™ 169 is the trade name for a hydrogel type silica supplied by the Davison Division of W. R. Grace, Columbia, Md.

Syloid™ 244 is the trade name for an aerogel type silica supplied by the Davison Division of W. R. Grace, Columbia, Md.

Spenlite™ L06-S-30 is an aliphatic urethane resin supplied by Reichhold, Research Triangle Park, N.C.

Fluorad™ FC 430 is a fluorocarbon additive supplied by Minnesota Mining and Manufacturing Company, St. Paul Minn.

EXAMPLE 8

In a suitable container, the following ingredients were combined and mixed under agitation. The combined liquid ingredients were mixed under moderate agitation, and the dry powders were added under moderate agitation and then dispersed using a high speed disperser for at least 15 minutes. The coating composition was mixed in air, and not under a nitrogen blanket, although it would be possible to mix and store the coating composition under a nitrogen atmosphere, and this could improve the shelf life of the compositions.

| Ingredients | Examples: | | | | |
|---|---|---|---|---|---|
| | 8A | 8B | 8C | 8D | 8E |
| BCEA | | | 24.5 | 20.9 | 27 |
| Ebecryl ™ 3604 | 22.7 | | | | |
| CN301 | | | | 8 | 6 |
| CN9050 | | 65.8 | | | |
| Ebecryl ™ 350 | | | | | 3 |
| Irgacure ® 500 | 1.5 | 1.2 | 1 | 1 | 1 |
| Methyl Ethyl Ketone | | 27.4 | | | |
| Butyl Acetate | 73.2 | | | | |
| Toluene | | | 23 | 23 | 20 |
| Isopropanol | | | 23 | 23 | 20 |
| Syloid ™ 169 | 2.3 | 5.3 | 7.8 | 7.8 | 7 |
| Spenlite ™ L06-S-30 | | | 20.4 | 16 | 16 |
| Fluorad ™ FC430 | 0.3 | 0.3 | 0.3 | 0.3 | 0.3 |
| Total | 100 | 100 | 100 | 100 | 100 |

BCEA is an abbreviation for Beta-Carboxyethyl Acrylate.

Ebecryl™ 3604 is the trademark for a rubber modified epoxy acrylate resin supplied by the UCB Chemicals Group, Smyrna, Ga.

CN301 is the product code for Polybutadiene Dimethacrylate and is supplied by the Sartomer Company, Inc. a member of Total Group, Exton, Pa.

CD9050 is the product code for a Monofunctional Acid Ester and is supplied by the Sartomer Company, Inc. a member of Total Group, Exton, Pa.

Ebecryl™ 350 is the trademark for a acrylated silicone supplied by the UCB Chemicals Group, Smyrna, Ga.

Irgacure® 500 is a registered trademarked product of Ciba Specialty Chemicals and is a blend of 50% benzophenone and 50% 1-Hydroxycyclohexylphenyl Ketone.

Syloid™ 169 is the trade name for a hydrogel type silica supplied by the Davison Division of W. R. Grace, Columbia, Md.

Spenlite™ L06-S-30 is an aliphatic urethane resin supplied by Reichhold, Research Triangle Park, N.C.

Fluorad™ FC 430 is a fluorocarbon additive supplied by Minnesota Mining and Manufacturing Company, St. Paul Minn.

EXAMPLE 9

In a suitable container, the following ingredients are combined and mixed under agitation. The combined liquid ingredients are mixed under moderate agitation, and the dry powders are added under moderate agitation and then dispersed using a high speed disperser for at least 15 minutes.

| Ingredients | Examples: | | | | |
|---|---|---|---|---|---|
| | 9A | 9B | 9C | 9D | 9E |
| BCEA | 45.4 | 45.4 | 45.4 | 45.4 | 45.4 |
| Escacure ™ TZT | 2 | 2 | 2 | 2 | 2 |
| Butyl Acetate | 46.8 | 46.8 | 46.8 | 46.8 | 46.8 |
| Orgasol ™ 1001 UD | 5.7 | | | | |
| Soft-Clad ® CFB-101-4 | | 5.7 | | | |
| Pergopak ™ M3 | | | 5.7 | | |
| Pergopak ™ M4 | | | | 5.7 | |
| Techpolymer ™ SBX-6 | | | | | 5.7 |
| Fluorad ™ FC430 | 0.1 | 0.1 | 0.1 | 0.1 | 0.1 |
| Total | 100 | 100 | 100 | 100 | 100 |

BCEA is an abbreviation for Beta-Carboxyethyl Acrylate.

Escacure™ TZT is a trade marked product supplied by Sartomer Company, Inc. a member of Total Group, Exton, Pa, and has Trimethylbenzophenone as the active ingredient.

Orgasol™ 1001 UD is the trade name for a Polyamide powder supplied by Elf Atochem North America with a sales office in Philadelphia, Pa.

Soft-Clad® CFB-101-40 is the trade name for Urethane beads supplied by Reichhold Chemicals, Inc., Research Triangle, N.C.

Pergopak™ M3 and Pergopak™ M4 are trade names for Urea methanol condensate powders supplied by Martinswerk GmbH, Bergheim, Germany.

Techpolymer™ SBX-6 is the trade name for an Polystyrene bead supplied by Sekisui Plastics Co., Ltd., Tokyo, Japan.

Fluorad™ FC 430 is a fluorocarbon additive supplied by Minnesota Mining and Manufacturing Company, St. Paul Minn.

EXAMPLE 10

The coatings of examples 1–8 are applied to a suitable substrate using one of a variety of techniques known in the art. The following examples will provide illustration of the variety of techniques available, but are not intended to restrict the methods of applying the coatings. As one example, the coatings have been applied using conventional air atomized spray. As another example, the coatings are applied by airless spray equipment. As another example, the coatings are applied using a draw bar to simulate the application of a roll coater. As another example, the coatings are poured down the substrate to simulate the application by flow or curtain coating. Alternatively, and preferably, the coatings are applied on an actual roll coater, reverse roll coater, flow coater or curtain coater in a normal production environment.

The solvents in the coatings were allowed to evaporate for between 10 seconds to several minutes and then cured in a UV processor. Many types of UV processors are available, and a number of different types of UV lamps are also available. As an illustration of the general process, a UV processor made by the Industrial Heating & Finishing Co., Inc., Birmingham, Ala. was used. A 300 watt/sq. in Mercury vapor lamp was used, and the coatings were cured at a line speed of 15 ft/min. The exposure was between 650 to 1800 kilojoules, and preferably around 1300 kilojoules.

EXAMPLE 11

The adhesion of the coatings are tested in accordance with the adhesion test method published by the American Society For Testing And Materials (ASTM) using the method D3359 (Volume 6.01), "Standard Test Methods for Measuring Adhesion by Tape Test", Test Method B—Cross-Cut Tape Test. This method, in abbreviated form, provides for cutting through the film in a crosshatch pattern of specified spacing, and taping the cut area with a specified tape, and then rapidly removing the tape. The cut area is then inspected to determine if paint has been loosed or removed, and the area is given a rating.

A rating of 5B is a perfect rating, requiring that none of the coating be removed. A rating of 0B would indicate that 65% or more of the coating was removed, thereby showing poor adhesion of the coating to the substrate.

One of the most difficult substrates on which to achieve good adhesion by a coating is thermoplastic olefin. Most of the of the example coatings were evaluated on a TPO sheet supplied by the Geon Engineered Films Group, headquartered in Winchester, Va., and this sheet represents commercial quality TPO moldable sheet. The TPO sheet was not subjected to any mechanical or chemical cleaning, nor were any pretreatment processes such as flame treatment, corona treatment, or plasma treatment utilized. No application of polychlorinated olefin adhesion promoters of the type described in the referenced patent literature were applied prior to the application of the example coatings.

Conventional coating compositions, when applied to the unpretreated TPO substrate used in this example, would typically have results of 0B–1B. Surprisingly and unexpectedly, the method of the present invention was found to provide coatings with perfect adhesion over a very broad range of examples as shown in Table 3.

TABLE 3

| Example Composition | ASTM D3359 Method B Rating | 60 Degree Gloss | Whitening |
|---|---|---|---|
| 1A | 5B | 45 | None |
| 1B | 5B | 20 | None |
| 1C | 5B | 56 | None |
| 1D | 5B | 80 | None |
| 1E | 5B | | None |
| 2A | 5B | 45 | None |
| 2B | 5B | | None |
| 2C | 5B | 16 | None |
| 2D | 5B | 6 | None |
| 2E | 5B | 1.2 | None |
| 2F | 5B | 1.5 | None |
| 3A | 5B | | None |
| 3B | 5B | | None |
| 3C | 5B | | None |
| 3D | 5B | | None |
| 3E | 5B | | None |
| 4A | 5B | | None |
| 4B | 5B | | None |
| 4C | 5B | | None |
| 4D | 5B | | None |
| 5A | 5B | 0.7 | None |
| 5B | 5B | 2 | None |
| 5C | 5B | 9 | None |
| 5D | 5B | 0.6 | None |

TABLE 3-continued

| Example Composition | ASTM D3359 Method B Rating | 60 Degree Gloss | Whitening |
|---|---|---|---|
| 5E | 5B | 3 | None |
| 5F | 5B | 0.5 | None |
| 5G | 5B | 2.5 | None |
| 5H | 5B | 0.8 | None |
| 5I | 5B | 1.9 | None |
| 6A | 5B | 7.2 | None |
| 6B | 5B | 25 | None |
| 6C | 5B | 8.5 | None |
| 6D | 5B | 7.5 | None |
| 6E | 5B | 4 | None |
| 6F | 5B |  | None |
| 6G | 5B | 3 | None |
| 6H | 5B | 2.7 | None |
| 6I | 5B | 5.2 | None |
| 7A | 5B | 8 | None |
| 7B | 5B | 0.6 | None |
| 7C | 5B | 5.2 | None |
| 7D | 5B | 1.4 | None |
| 7E | 5B | 1.7 | None |
| 7F | 5B | 3 | None |
| 7G | 5B | 0.5 | None |
| 7H | 5B |  | Whitened |
| 7I | 5B |  | None |
| 8A | 5B |  | None |
| 8B | 5B | 2.8 | None |
| 8C | 5B | 0.5 | None |
| 8D | 5B | 0.4 | None |
| 8E | 5B | 1 | None |

It is also well-known that it is difficult to achieve low-gloss coatings with UV-cured compositions. In particular, it is known by those skilled in the art that it is very difficult to achieve low glosses without a visible whitening of a clear film.

The gloss of a coating is typically measured using a gloss meter, and such instruments are commonly used in the coatings industry. One example of such instrumentation is the Byk Gardner micro-TRI-gloss meter. Gloss measurements were taken of a number of the example compositions from the present invention using this instrument.

Surprisingly and unexpectedly, many of the example compositions of the present invention achieved glosses below 10% on a 60 degree meter without significant or observable whitening. The measured gloss readings of many of the example compositions of the present invention are also shown in Table 3.

What is claimed is:

1. A radiation curable composition comprising about 20 to about 100 percent by weight free-radical curable resin components consisting essentially of monomers, oligomers, or combinations thereof, each a mono or poly-ester of acrylic acid or methacrylic acid, and each of said esters having a boiling point greater than 162° C. and a molecular weight of about 150 to about 10,000;
about 0.1 to about 10 percent by weight of a free radical photoinitiator, and
about 0 to about 60% by weight of an organic solvent.

2. A radiation curable composition of claim 1 wherein at least a portion of the esters is carboxy functional.

3. The radiation curable composition of claim 1 wherein at least a portion of the esters is an acrylic acid or methacrylic acid ester of a polyol containing at least 4 carbon atoms.

4. The radiation curable composition of claim 1 wherein at least a portion of the esters include a carbamate functionality.

5. A radiation curable composition of claim 1 wherein some or all of the alpha,beta ethylenically unsaturated monomers and oligomers are the reaction product of either acrylic acid or methacrylic acid and polybutadiene.

6. The radiation curable composition of claim 1 wherein at least a portion of the esters are acrylic acid or methacrylic acid esters of isoborneol.

7. The radiation curable composition of claim 1 wherein at least a portion of the esters is beta-carboxyethyl acrylate or beta-carboxyethyl methacrylate.

8. A radiation curable composition of claim 1 wherein either polybutadiene diacrylate or polybutadiene dimethacrylate is used as at least one of the oligomers.

9. The radiation curable composition of claim 1 further comprising about 0 to about 50 percent by weight of polymeric beads or powder having a median particle size of about 1 to about 60 microns dispersed in said composition.

10. The radiation curable composition of claim 9 wherein the polymer beads or powder comprises polymers or copolymers of acrylic or methacrylic acid, esters thereof and styrene.

11. The radiation curable composition of claim 9 wherein the polymer beads or powder comprises a polyamide.

12. The radiation curable composition of claim 9 wherein the polymer beads or powder comprises a polyurethane.

13. The radiation curable composition of claim 9 wherein the polymer beads or powder comprises a urea/urea methanol condensate or polyurea.

14. The radiation curable composition of claim 1 further comprising up to about 30 percent silica by weight dispersed in said composition.

15. The composition of claim 14 further comprising up to about 50 percent by weight of polymer beads or powder having a mean particle size of about 1 to about 60 microns dispersed in said composition.

16. A method for reducing the gloss of the surface of a thermoplastic substrate comprising the steps of:
obtaining a thermoplastic sheet stock;
applying to said sheet stock a radiation curable composition of claim 1;
irradiating the coated surface with UV radiation for a time sufficient to initiate polymerization of free radical curable components; and
forming the thermoplastic sheet stock to a pre-determined shape.

17. The method of claim 16 wherein the plastic substrate is selected from the group consisting of thermoplastic olefin, ethylene/propylene/diene/monomer rubber (EPDM) EPDM, vinyl, and synthetic and natural rubber.

18. The method of claims 17 wherein the plastic substrate is in the form of a moldable thermoplastic sheet suitable for optional lamination and molding.

19. The method of claim 16 wherein the radiation curable composition is applied by a process selected from the group consisting of air assisted spray application, airless spray application, electrostatic spray application, roll coating, reverse roll coating, curtain coating, dipping, and flow coating.

20. A method of manufacturing a low-gloss, scratch-resistant thermoplastic article comprising the steps of:
obtaining a thermoplastic sheet stock;
applying to said thermoplastic sheet stock a radiation curable composition of claim 1;
irradiating the coated surface with UV radiation for a time sufficient to initiate polymerization of free radical curable components; and forming the thermoplastic sheet stock to a pre-determined shape.

21. The method of claim 20 wherein the thermoplastic sheet stock is selected from the group consisting of thermoplastic olefin, EPDM, vinyl, and synthetic and natural rubber.

22. The method of claims 20 wherein the thermoplastic sheet stock is in the form of a moldable thermoplastic sheet suitable for optional lamination and molding.

23. The method of claim 20 wherein the radiation curable composition is applied by a process selected from the group consisting of air assisted spray application, airless spray application, electrostatic spray application, roll coating, reverse roll coating, curtain coating, dipping, and flow coating.

24. An article of manufacture prepared in accordance with the method of claim 16.

25. An article of manufacture prepared in accordance with the method of claim 20.

* * * * *